US007899911B2

(12) United States Patent
Jensen et al.

(10) Patent No.: US 7,899,911 B2
(45) Date of Patent: Mar. 1, 2011

(54) METHOD AND APPARATUS TO RETRIEVE INFORMATION IN A NETWORK

(75) Inventors: Kell Michael Jensen, Gentofte (DK); Alex Agerholm, Glostrup (DK)

(73) Assignee: Intel Corporation, Santa Clara, CA (US)

( * ) Notice: Subject to any disclaimer, the term of this patent is extended or adjusted under 35 U.S.C. 154(b) by 1929 days.

(21) Appl. No.: 09/877,928

(22) Filed: Jun. 7, 2001

(65) Prior Publication Data

US 2002/0188698 A1 Dec. 12, 2002

(51) Int. Cl.
*G06F 15/16* (2006.01)
(52) U.S. Cl. ...................................... 709/227; 709/219
(58) Field of Classification Search .................. 709/202, 709/226, 219, 227, 228, 203
See application file for complete search history.

(56) References Cited

U.S. PATENT DOCUMENTS

| | | | | |
|---|---|---|---|---|
| 5,802,292 A | * | 9/1998 | Mogul | 709/203 |
| 5,852,717 A | * | 12/1998 | Bhide et al. | 709/203 |
| 5,991,306 A | * | 11/1999 | Burns et al. | 370/429 |
| 6,003,082 A | * | 12/1999 | Gampper et al. | 709/225 |
| 6,085,193 A | * | 7/2000 | Malkin et al. | 707/10 |
| 6,167,438 A | * | 12/2000 | Yates et al. | 709/216 |
| 6,185,625 B1 | * | 2/2001 | Tso et al. | 709/247 |
| 6,247,050 B1 | * | 6/2001 | Tso et al. | 709/224 |
| 6,421,733 B1 | * | 7/2002 | Tso et al. | 709/246 |
| 6,438,652 B1 | * | 8/2002 | Jordan et al. | 711/120 |
| 6,553,420 B1 | * | 4/2003 | Karger et al. | 709/226 |
| 6,701,415 B1 | * | 3/2004 | Hendren, III | 711/138 |
| 6,792,461 B1 | * | 9/2004 | Hericourt | 709/225 |
| 6,792,463 B1 | * | 9/2004 | Lamberton et al. | 709/227 |
| 6,839,881 B2 | * | 1/2005 | Myers et al. | 715/513 |
| 6,871,236 B2 | * | 3/2005 | Fishman et al. | 709/246 |
| 2001/0056476 A1 | * | 12/2001 | Benayoun et al. | 709/218 |
| 2003/0043844 A1 | * | 3/2003 | Heller | 370/466 |

FOREIGN PATENT DOCUMENTS

CN      1294712 A      5/2001
WO      98/43177 A1    10/1998

OTHER PUBLICATIONS

Netscape Communications Corporation, Netscape Proxy Server Administrator's Guide, Version 3.5 for Unix, Mar. 1998, from http://developer.netscape.com/docs/manuals/proxy.html, Introduction, Table of Contents, Chapters 5 and 9, pp. 1-52 as printed.*
Angel, "Lesson 129: Proxy Servers," Apr. 1999, Network Magazine, vol. 14, Iss. 4, pp. 27ff.*
WinRoute Pro 3.0 User's Manual; Tiny Software Inc.; 1999.*
Rubas; WinProxy 1.4 User's Manual; 1997.*
C2NET Software, Inc., "Stronghold Web Server 2.4.1 Adminstration Guide," 'Online!; Sep. 1998 XP002214714, 37 pages.
Intel Corp., "Persistence Mechanisms—Enabling today's dynamic e-Business transactions," White paper, 'Online! 2000 XP002214713, 8 pages.
Alteon Websystems; "Virtual Matrix Architecture: Scaling Web Services for Performance and Capacity," White paper, 'Online! Apr. 2000, XP002191242, 13 pages.

* cited by examiner

*Primary Examiner* — Aaron Strange
(74) *Attorney, Agent, or Firm* — Kacvinsky Daisak PLLC

(57) ABSTRACT

An improved method and apparatus to retrieve information over a network is described.

18 Claims, 4 Drawing Sheets

METHOD AND APPARATUS TO RETRIEVE INFORMATION IN A NETWORK

BACKGROUND

A network typically comprises a plurality of network nodes connected together by a communications medium. A network node may comprise, for example, a switch, router, personal computer, server, network appliance or any other network device. A network node, such as a server, may store information in the form of files created in accordance with various formats, such as a hypertext markup language (HTML) file, extensible markup language (XML) file, and so forth. A file may also be referred to as a "page" or "web page." Whenever a user may desire a particular file, the user may request access to the file using a number of network protocols. A protocol may be a predetermined process by which information is exchanged between network nodes.

Due to the high performance demands of certain applications, it may become necessary to implement technology to ensure that a user may access a desired file with a high level of confidence and reduced latency. To accomplish this, the same file may be stored on a number of different servers. Whenever a user sends a request to access a file stored on a server, the request may be intercepted by a network access device, such as a "load balancer" or "web switch." The network access device may operate to coordinate and control how information is stored and accessed in order to optimize overall network performance. Optimized performance might be realized, for example, in lower access times for information stored on the servers. Due to the increasing demands for lower access times, it can be appreciated that there is a substantial need for technologies that may retrieve information faster from a server over a network.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
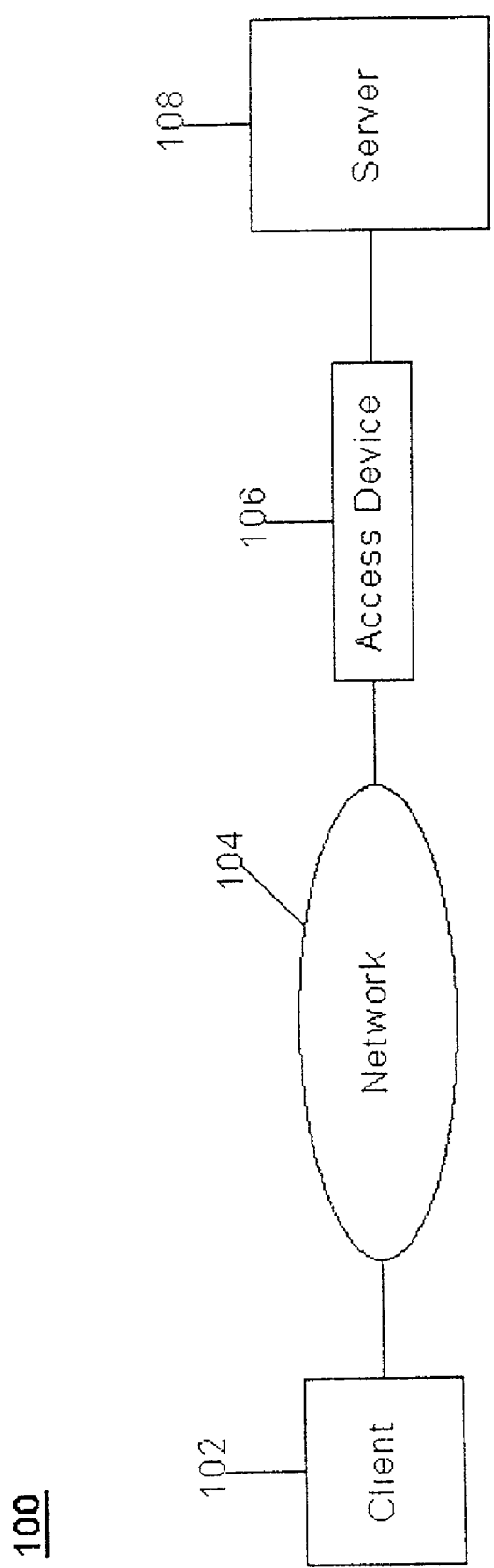
FIG. 1 is a system suitable for practicing one embodiment of the invention.

In the following detailed description, numerous specific details are set forth in order to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention.

One embodiment of the invention may increase the speed by which information may be retrieved from a server. The server may be connected to an access device, such as a load balancer, web switch, virtual private network gateway, and so forth. The access device may manage how information is stored and retrieved from the server. For example, a load balancer may operate to make multiple servers appear like a single, high-powered network resource to those accessing the array of servers. It does this by selectively forwarding connections to the many servers arrayed behind it in an equitable manner, according to such factors as the server's operational health, nature of the query and so forth. The load balancer may check the operational health of a server by testing the server with an artificial client, or by sending it a series of scripts that can try out critical pages and look at the responses, for example.

A user may typically attempt to access information on a server using a browser located on a client computer, such as a personal computer (PC). The information may comprise, for example, a web page. The user may initiate the action by typing in an information identifier for the web page. An example of an information identifier may be a uniform resource locator (URL). The browser may then use the URL to attempt to establish a connection between the client computer and the server where the web page is stored using a conventional network protocol. An example of such a protocol may include the Hypertext Transfer Protocol (HTTP) Version 1.1 as defined by the Internet Engineering Task Force (IETF) Draft Standard Request For Comment (RFC) 2616, June 1999, and available from "www.ietf.org" ("HTTP Specification"), although the embodiments of the invention are not limited in this context.

The network access device such as a load balancer may intercept and process the connection request on behalf of the server. If the requested web page resides on more than one server in the network, the load balancer may select a particular server based on various parameters, such as those discussed above. The load balancer may then attempt to establish a connection with the selected server. Once a connection is established with the appropriate server, the server may send the requested web page to the load balancer. The load balancer may then send the web page to the client computer, where the browser may display the web page for the user.

A problem may occur if there is an unreasonable delay in accessing the web page. The user may get impatient and cancel the request, only to submit another request for the same web page immediately thereafter. The cancellation may result in the termination of the connection between the client computer and the load balancer, and also the connection between the load balancer and the server. Once the user submits the other request, both connections will have to be re-established prior to retrieving the requested information. This may lead to the inefficient use of network resources.

To avoid this and other potential problems, one embodiment of the user maintains the connection between the load balancer and the server despite the cancellation of the connection between the client computer and the load balancer. Once the load balancer receives the requested information, the load balancer may store the requested information with the source address of the client computer and the information address of the information (e.g., the URL) in an information table. If the client computer attempts to establish a new connection requesting the same information, the load balancer may retrieve the information from the information table and send it to the client computer without having to open a new connection to the server.

This embodiment of the invention provides several advantages. For example, this embodiment of the invention avoids the latency associated with re-establishing a connection between the load balancer and the server. The load balancer may also avoid having to go through the selection process to select a particular server from the group or cluster of servers. In addition, the server would not have to retrieve the information twice, thereby releasing resources for other uses.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Referring now in detail to the drawings wherein like parts are designated by like reference numerals throughout, there is illustrated in FIG. 1 a system suitable for practicing one embodiment of the invention. FIG. 1 is a block diagram of a network 100. Network 100 may comprise a client computer 102, a network 104, an access device 106 and a server 108. In one embodiment of the invention, server 108 may be part of an array of servers connected together by a network, for example.

Figure 2:
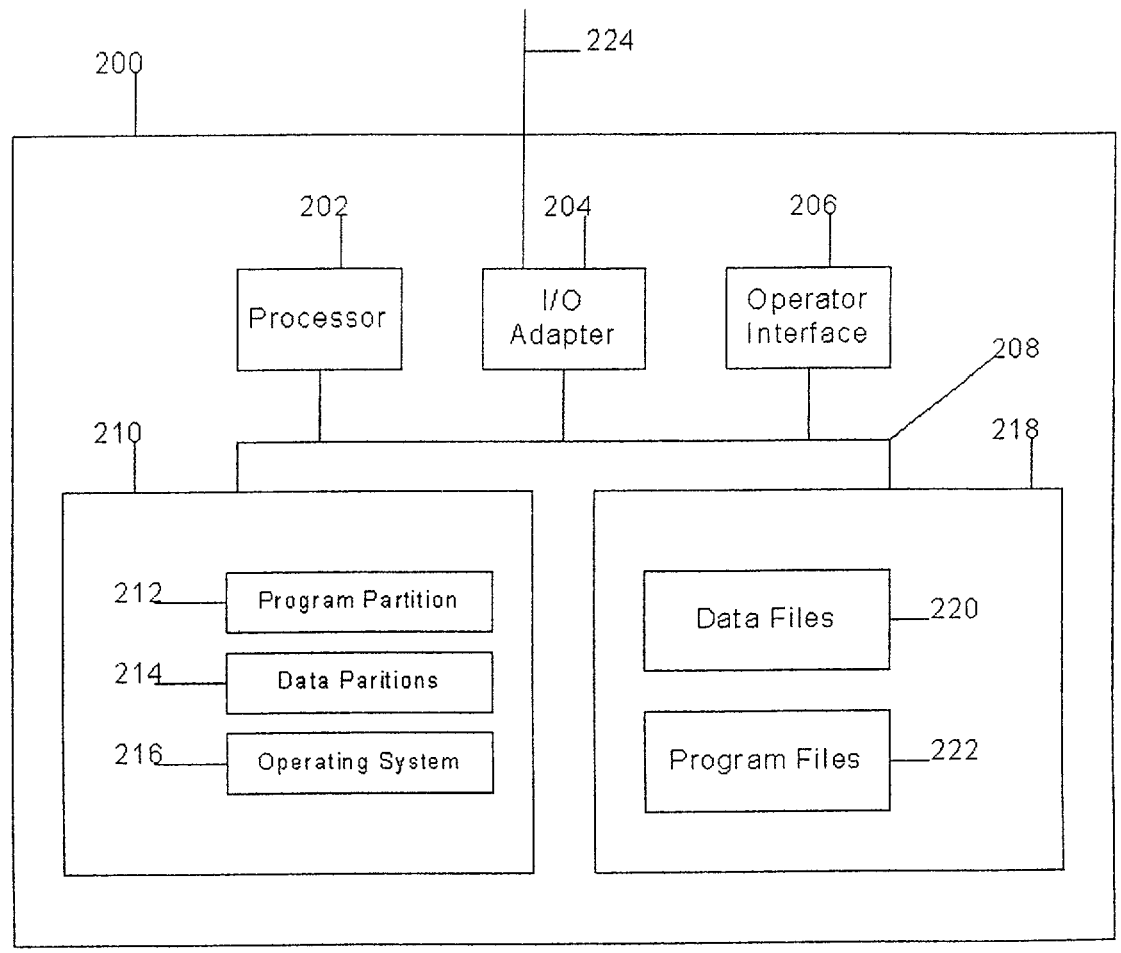
FIG. 2 is a block diagram of an access device in accordance with one embodiment of the invention.

FIG. 2 is a block diagram of a system in accordance with one embodiment of the invention. FIG. 2 illustrates a system 200 that may be representative of an access device, such as access device 106. As shown in FIG. 2, system 200 may comprise a processor 202, an input/output (I/O) adapter 204, an operator interface 206, a memory 210 and a disk storage 218. Memory 210 may store computer program instructions and data. The term "program instructions" may include computer code segments comprising words, values and symbols from a predefined computer language that, when placed in combination according to a predefined manner or syntax, cause a processor to perform a certain function. Examples of a computer language may include C, C++ and assembly. Processor 202 executes the program instructions, and processes the data, stored in memory 210. Disk storage 218 stores data to be transferred to and from memory 210. I/O adapter 204 communicates with other devices and transfers data in and out of the computer system over connection 224. Examples of other devices may include a microphone and display, such as microphone 106 and display 102, respectively. Operator interface 206 may interface with a system operator by accepting commands and providing status information. All these elements are interconnected by bus 208, which allows data to be intercommunicated between the elements.

Processor 202 can be any type of processor capable of providing the speed and functionality required by the embodiments of the invention. For example, processor 202 could be a processor from family of processors made by Intel Corporation, Motorola Incorporated, Sun Microsystems Incorporated, Compaq Computer Corporation and others. Processor 202 may also comprise a digital signal processor (DSP) and accompanying architecture, such as a DSP from Texas Instruments Incorporated.

In one embodiment of the invention, memory 210 and disk storage 218 may comprise a machine-readable medium and may include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM) and any other media that may store digital information. In one embodiment of the invention, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, client 200 may contain various combinations of machine-readable storage devices through various I/O controllers, which are accessible by processor 202 and which are capable of storing a combination of computer program instructions and data.

Memory 210 is accessible by processor 202 over bus 208 and includes an operating system 216, a program partition 212 and a data partition 214. In one embodiment of the invention, operating system 216 may comprise an operating system sold by Microsoft Corporation, such as Microsoft Windows® 95, 98, 2000 and NT, for example. Program partition 212 stores and allows execution by processor 202 of program instructions that implement the functions of each respective system described herein. Data partition 214 is accessible by processor 202 and stores data used during the execution of program instructions.

In one embodiment of the invention, program partition 212 contains program instructions that may be collectively referred to herein as an information management component. Although this embodiment of the invention uses one component, it can be appreciated that the functionality performed by this component may be combined with other components, or separated into additional components, and still fall within the scope of the invention.

I/O adapter 204 may comprise a network adapter or network interface card (NIC) configured to operate with any suitable technique for controlling communication signals between computer or network devices using a desired set of communications protocols, services and operating procedures, for example. In one embodiment of the invention, I/O adapter 204 may operate, for example, in accordance with the Transmission Control Protocol (TCP) as defined by the IETF standard 7, RFC 793, adopted in September, 1981, and the Internet Protocol (IP) as defined by the IETF standard 5, RFC 791, adopted in September, 1981, both available from "www.ietf.org", although the embodiments of the invention are not limited to this context. I/O adapter 204 also includes appropriate connectors for connecting I/O adapter 204 with a suitable communications medium. I/O adapter 204 may receive communication signals over any suitable medium such as copper leads, twisted-pair wire, co-axial cable, fiber optics, radio frequencies, and so forth.

The operations of systems 100 and 200 may be further described with reference to FIG. 3 and its accompanying examples. Although FIG. 3 as presented herein may include a particular processing logic, it can be appreciated that the processing logic merely provides an example of how the general functionality described herein can be implemented. Further, each operation within a given processing logic does not necessarily have to be executed in the order presented unless otherwise indicated.

Figure 3:
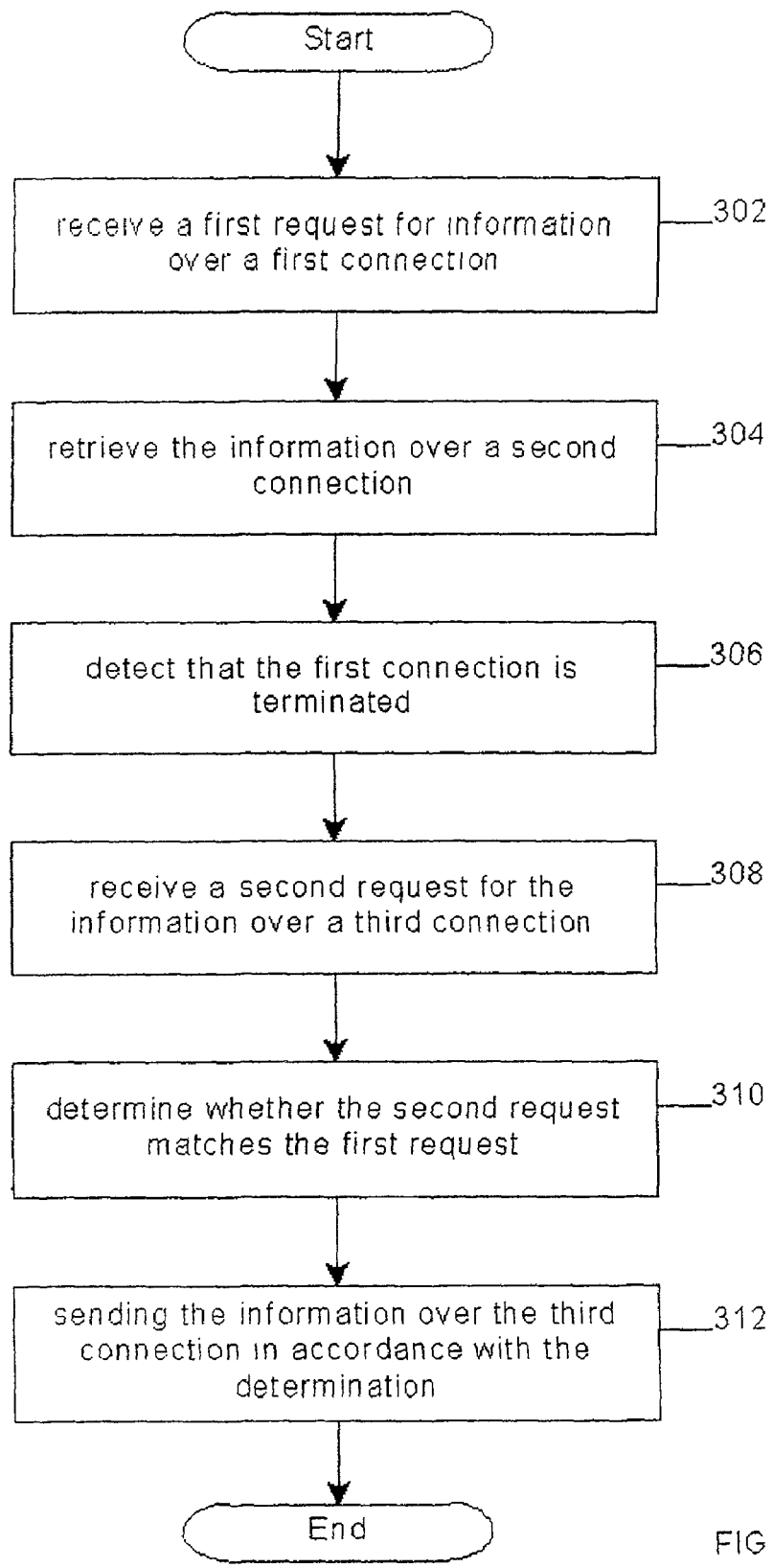
FIG. 3 is a block flow diagram of the programming logic performed by an information management component in accordance with one embodiment of the invention.

FIG. 3 is a block flow diagram of the programming logic performed by an information management component in accordance with one embodiment of the invention. As shown in FIG. 3, a first request for information is received over a first connection at block 302. The first request for information may be, for example, a request for a web page using an HTTP "Get" command in accordance with the HTTP Specification. The first connection may be, for example, a connection between a client computer and an access device, such as access device 106. The information may be retrieved over a second connection at block 304. The second connection may be, for example, a connection between an access device and a server containing the requested information, such as server 108. The access device may detect that the first connection has been terminated at block 306. The first connection may be terminated for various reasons, such as intentionally by the user via a cancellation or refresh request sent from a browser at the client computer, a break in the physical or logical connection between the client computer and access device, and so forth. The access device may receive a second request for the information over a third connection at block 308. The third connection may comprise, for example, a new connection between the client computer and the access device to replace the terminated first connection. The access device may determine whether the second request matches the first request at block 310. The access device may send the information over the third connection at block 312 in accordance with the determination at block 310.

After retrieving the information at block 304, the access device may store the information in memory, such as memory 210 or disk storage 218. In one embodiment of the invention, the first request may comprise a first source address and a first information address. The access device may store the first source address, the first information address and the information in an information table. The access device may receive a second request at block 308. The second request may comprise a second source address and a second information address. The access device may search the information table to determine whether the second source address matches the first source address, and the first information address matches the second information address. If both match, the access device may retrieve the information corresponding to the first source address and first information address, and send the information to the client computer over the third connection.

In one embodiment of the invention, the source address may comprise an IP address, the information address may comprise a URL, and the information may comprise a web page, such as an HTML or XML file. It can be appreciated, however, that the source address, information address and information may be in other formats in accordance with a desired set of protocols, and still fall within the scope of the invention.

Once the client computer receives the requested information, the client computer may send a request to terminate the third connection between the client computer and the access device. The access device may then terminate the second connection between the access device and the server, and the third connection, in accordance with the particular protocol used.

Figure 4:
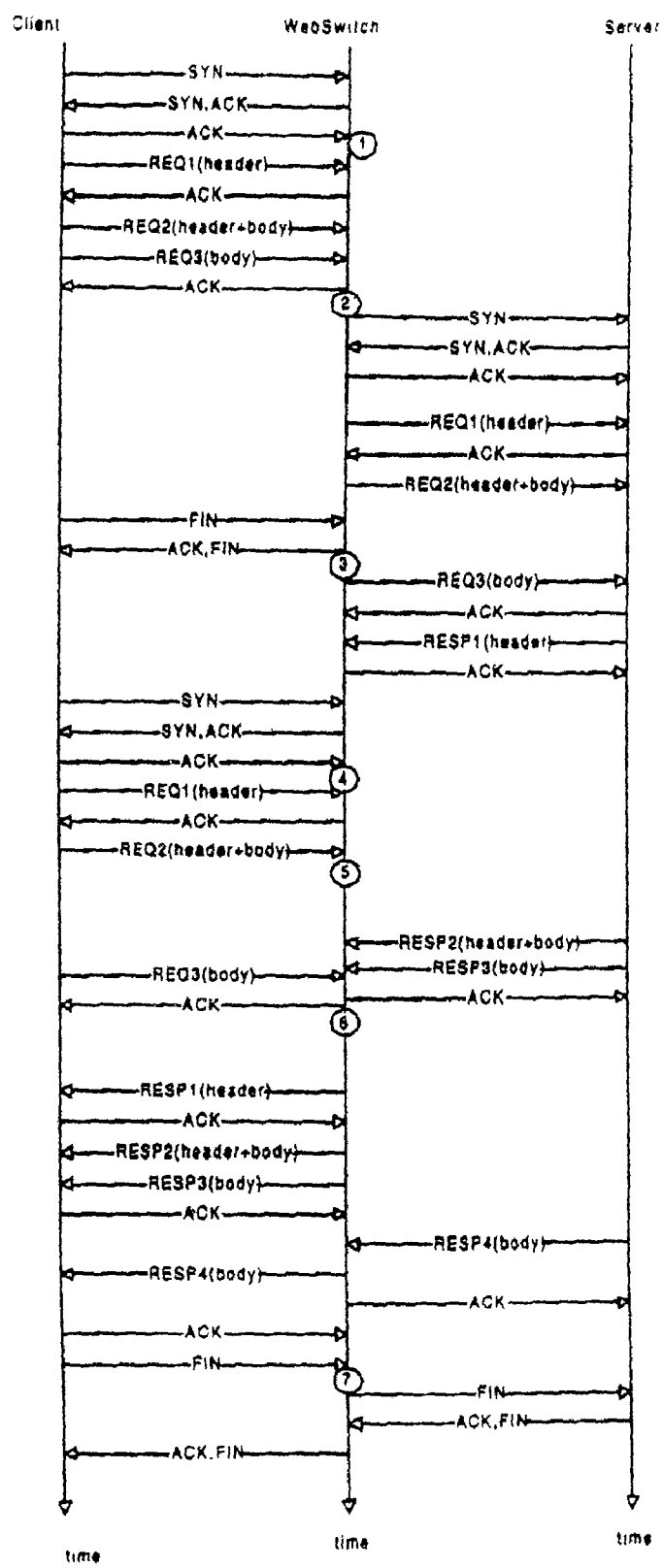
FIG. 4 illustrates a message flow in accordance with one embodiment of the invention.

FIG. 4 illustrates a message flow in accordance with one embodiment of the invention. As shown in FIG. 4, a TCP session is set up between a client computer and an access device, and the access device and a server. The access device may be, for example, a web switch. A web switch may operate similar to a load balancer.

In segment 1, a TCP session may be set up between the client computer and the web switch. In this example of a message flow, there is no TCP connection set up between the web switch and the server yet. During segment 1, the client computer may send the URL for the desired web page.

Once the access device has received and stored the requested URL, the web switch may enter segment 2. Segment 2 may include, for example, selecting a server having the requested web page. The web switch may set up a TCP connection toward the selected server, and passes the URL request to the server over the opened connection.

In segment 3, the TCP connection from the client computer to the web switch is terminated prior to receiving the requested information from the server. The web switch, however, keeps the TCP connection toward the server open to receive the requested information.

In segment 4, a new TCP session is set up between the client computer and the web switch. The client computer sends a request for a URL. Since the TCP connection between the web switch and the server remains open, a new TCP connection between the web switch and the server is not opened.

In segment 5, the web switch checks its information table to determine whether there is an outstanding URL request toward the server for the source IP address already. If so, the previous URL request is spliced with the new URL request. As a result, the web switch may avoid selecting a server, opening a new connection, and sending the new URL request to the selected server.

In segment 6, the web switch may receive the web page associated with the previous URL request. The web switch may perform a validation process to ensure that the received web page is the same as the one requested in the new URL request, the web page is timely, and so forth. If the web page is valid, the web switch may send the web page to the client computer. If the web page is not valid, a new server may be selected, a connection opened with the server, and a new URL request sent to the selected server.

In segment 7, the web switch may receive a request to terminate the connection between the client computer and the web switch. Once it receives this request, the web switch may terminate the open connection between the web switch and the server.

Once the web switch has sent the web page to the client computer, the web page may delete the web page and corresponding entries from its information table. Alternatively, the web switch may maintain the information similar to a caching appliance, and delete it after a certain time has passed, for example. In this example, the web switch may associate an aging timer with the source address, URL and information, and may delete certain entries at periodic or predetermined intervals. This may be implemented to avoid exceeding memory thresholds or keeping invalid information. In one embodiment of the invention, the web switch may use a first-in-first-out (FIFO) concept, where the oldest stored information may be deleted if maximum memory usage is reached.

In one embodiment of the invention, the servers may not use the source IP address to send the requested information. This may occur, for example, in a network using network address translation (NAT) technology. In this embodiment of the invention, it may not be necessary for the web switch to store the source IP address together with the URL in its information table.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

The invention claimed is:

1. A method to retrieve information, comprising:
   receiving a first request for information from a client at a network node over a first connection;
   establishing a second connection to retrieve said information;
   detecting that said first connection is terminated prior to retrieval of said information over said second connection;
   retrieving said information over said second connection;

receiving a second request at the network node for said information over a third connection;
determining whether said second request matches said first request, including whether said second request is from said client;
sending said information over said third connection in accordance with said determination; and
deleting said information at the network node upon delivery of said information to said client.

2. The method of claim 1, wherein said first request comprises a first source address and a first information address, further comprising storing said information with said first source address and said first information address in an information table prior to receiving said second request.

3. The method of claim 2, wherein said second request comprises a second source address and a second information address, and said determining comprises:
searching said information table to determine whether said second source address matches said first source address; and
determining whether said first information address matches said second information address.

4. The method of claim 3, wherein said source addresses comprise Internet addresses, and said information addresses comprise uniform resource locators.

5. The method of claim 1, wherein said information comprises a hypertext markup language (HTML) file.

6. The method of claim 1, wherein said information comprises an extensible markup language (XML) file.

7. The method of claim 1, further comprising:
receiving a request to terminate said third connection; and
terminating said second and third connections.

8. A method to retrieve information in a network, comprising:
receiving a first request for information from a first network node at a second network node over a first connection;
sending said first request over a second connection to a third network node;
receiving a notice that said first connection is terminated prior to retrieval of said information over said second connection;
receiving said information over said second connection at said second network node;
receiving a second request for said information over a third connection at said second network node;
determining whether said second request matches said first request, including whether said second request is from said first network node;
sending said information over said third connection to said first network node; and
deleting said information at the second network node upon delivery of said information to said first network node.

9. The method of claim 8, wherein said first request comprises a first source address and a first information address, further comprising storing said information with said first source address and said first information address in an information table at said second network node prior to receiving said second request.

10. The method of claim 9, wherein said second request comprises a second source address and a second information address, and said sending comprises:
searching said information table to determine whether said second source address matches said first source address;
determining whether said first information address matches said second information address; and
sending said information in accordance with said determination.

11. The method of claim 9, wherein said source addresses comprise Internet addresses, and said information addresses comprise uniform resource locators.

12. The method of claim 8, wherein said information comprises a hypertext markup language (HTML) file.

13. The method of claim 8, wherein said information comprises an extensible markup language (XML) file.

14. The method of claim 8, further comprising:
receiving a request to terminate said third connection; and
terminating said second and third connections.

15. An article comprising:
a storage medium;
said storage medium including stored instructions that, when executed by a processor, result in receiving a first request for information from a client at a network node over a first connection, establishing a second connection to retrieve said information, detecting that said first connection is terminated prior to retrieval of said information over said second connection, retrieving said information over said second connection, receiving a second request for said information at the network node over a third connection, determining whether said second request matches said first request including whether said second request is from said client, sending said information over said third connection in accordance with said determination, and deleting said information at the network node upon delivery of said information to said client.

16. The article of claim 15, wherein said first request comprises a first source address and a first information address, and the stored instructions, when executed by a processor, further result in storing said information with said first source address and said first information address in an information table prior to receiving said second request.

17. The article of claim 16, wherein said second request comprises a second source address and a second information address, and the stored instructions, when executed by a processor, further result in determining whether said second request matches said first request by searching said information table to determine whether said second source address matches said first source address, and determining whether said first information address matches said second information address.

18. The article of claim 15, wherein the stored instructions, when executed by a processor, further result receiving a request to terminate said third connection, and terminating said second and third connections.

* * * * *